US012180000B2

(12) United States Patent
Chapman

(10) Patent No.: US 12,180,000 B2

(45) Date of Patent: Dec. 31, 2024

(54) REFUSE CONTAINER

(71) Applicant: Anthony Richard Chapman, Norman, OK (US)

(72) Inventor: Anthony Richard Chapman, Norman, OK (US)

( * ) Notice: Subject to any disclaimer, the term of this patent is extended or adjusted under 35 U.S.C. 154(b) by 266 days.

(21) Appl. No.: 17/489,287

(22) Filed: Sep. 29, 2021

(65) Prior Publication Data

US 2022/0017301 A1 Jan. 20, 2022

Related U.S. Application Data

(63) Continuation-in-part of application No. 15/847,461, filed on Dec. 19, 2017, now abandoned.

(51) Int. Cl.
*B65F 1/16* (2006.01)

(52) U.S. Cl.
CPC .......... *B65F 1/1615* (2013.01); *B65F 1/1646* (2013.01); *B65F 2001/1653* (2013.01); *B65F 2210/148* (2013.01)

(58) Field of Classification Search
CPC ............ B65F 1/1615; B65F 2001/1669; B65F 2001/1653; B65F 2210/148
USPC .......................................................... 220/324
See application file for complete search history.

(56) References Cited

U.S. PATENT DOCUMENTS

| | | | | |
|---|---|---|---|---|
| 5,772,264 A * | 6/1998 | Bettenhausen | B65F 1/1615 | 292/130 |
| 9,682,819 B2 * | 6/2017 | Reeb | B65F 1/1615 | |
| 2012/0273495 A1 * | 11/2012 | D'Alessandro | B65F 1/1646 | 220/326 |
| 2014/0306465 A1 * | 10/2014 | Kreitzer | E05F 1/002 | 292/305 |
| 2016/0083186 A1 * | 3/2016 | Wright | B65F 1/1615 | 220/324 |
| 2016/0257491 A1 * | 9/2016 | Manssourian | B65F 1/1615 | |

* cited by examiner

*Primary Examiner* — Jeffrey R Allen
(74) *Attorney, Agent, or Firm* — Klarquist Sparkman, LLP

(57) ABSTRACT

A refuse container that includes a container that has an open-top and a skirt around a periphery of the open-top. A lid can be pivotally coupled to the container or the skirt. The refuse container further includes a hook assembly, the hook assembly includes a prolonged bar coupled to the lid using fasteners and an elongated bar. The elongated bar has a substantially L-shape proximal end and a hook shape distal end, wherein the substantially L-shape proximal end swively couples to the prolonged bar such that the elongated bar can extend downwards along by a height of the skirt and the hook shape distal end of the elongated bar can rest against a wall of the container or the elongated bar can rest against a periphery of the skirt, wherein the hook shape distal end hangs under the periphery of the skirt.

15 Claims, 3 Drawing Sheets

REFUSE CONTAINER

CROSS-REFERENCE TO RELATED APPLICATIONS

This application is a continuation-in-part of a U.S. non-provisional patent application Ser. No. 15/847,461, filed on Dec. 19, 2017, which is incorporated herein by reference in its entirety.

FIELD OF INVENTION

The present invention relates to a refuse container, and more particularly, the present invention relates to an improved hook assembly for a refuse container.

BACKGROUND

Refuse containers of large capacities are generally provided to residents individually or in sharing for the collection of garbage. Additionally, the refuse containers may also be provided at public places. Garbage trucks collect the waste from the refuse containers. The refuse containers can be inverted into the garbage truck to transport the garbage to treatment sites.

Generally, a refuse container can include a container and a lid pivotally coupled to the container. Although, a lid is useful in preventing the garbage from falling from the container, however, the lids can shudder in wind and produce harsh noise. If hooks are provided to lock the lids, the hook has to be manually latched and unlatched, which is laborious and not desired. The prior art discloses various mechanisms for securing the lid to the container, however, the known mechanisms are generally complex including multiple components, and may fail in the long term due to weathering and deformation of the lid. Moreover, known mechanisms are generally costly. Additionally, the known mechanism may not retrofit to old containers or may require significant modification to the container. Replacing the whole container can be costly and often not feasible. Also, the refuse containers are generally owned by a public agency, and modifications of the containers may not be an option.

Thus, a desire is there for a hook assembly for refuse containers that can retrofit old refuse containers as well as can be installed at the time of manufacturing. Moreover, a need is there for a hook assembly for refuse containers that do not have the aforesaid drawbacks.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an improved hook assembly for refuse containers to secure the lid to the container.

It is another object of the present invention that the hook assembly can act as a handle to lift the lid.

It is still another object of the present invention that the hook assembly can automatically disengage upon tilting the refuse container.

It is yet another object of the present invention that the hook assembly is simpler in construction and cost-effective to manufacture.

It is a further object of the present invention that the hook assembly can withstand deformation of the refuse container resulting in longer life.

It is still a further object of the present invention that the refuse container can be easily repaired.

It is yet another object of the present invention that the hook assembly can be automatically engaged.

It is an additional object of the present invention that the hook assembly can retrofit without any modifications to a refuse container.

In one aspect, disclosed is a refuse container that includes a container that has an open-top and a skirt around a periphery of the open-top. A lid can pivotally couple to the container or the skirt. The refuse container further includes a hook assembly, the hook assembly includes a prolonged bar an elongated bar. The prolonged bar coupled to the lid using fasteners, wherein the prolonged bar can swivel relative to the fasteners. The elongated bar has a substantially L-shape proximal end and a hook shape distal end, wherein the substantially L-shape proximal end swively coupled to the prolonged bar, such that the elongated bar can extend downwards along by a height of the skirt and the hook shape distal end of the elongated bar can rest against a wall of the container or the elongated bar can rest against the periphery of the skirt, wherein the hook shape distal end hangs just below the periphery of the skirt.

In one implementation of the refuse container, the periphery of the skirt limits the vertical movement of the hook shape distal end, and wherein lifting of the lid is limited to a distance between the periphery of the skirt and the hook shape distal end. The distance between a front of the skirt and the elongated bar is at least to permit a hand to be inserted between the skirt and the elongated bar for grasping the elongated bar. The length of the prolonged bar is at least half the length of the side of the lid parallel to the prolonged bar, for example, the length of the prolonged bar is one-third of the length of the side of the lid. The prolonged bar can be coupled to the lid using a pair of fasteners, such as eye bolts. Alternatively, the prolonged bar can couple to the lid through a pair of clamps secured to the lid, which avoids having the apertures or modifications in the lid. In one case, the length of the prolonged bar is about 15-20 inches and the length of the elongated bar is about 12 to 14 inches, wherein the substantially L-shape distal end is coupled at about mid of the prolonged bar.

In one aspect, disclosed is an assembly to secure the opening of a lid in a refuse container, the refuse container has an open-top and a skirt around a periphery of the open-top, the skirt is of a predetermined height and thickness, the lid pivotally coupled to the skirt, the assembly includes a prolonged bar; a pair of fasteners for coupling the prolonged bar to the lid; and an elongated bar swively coupled to the prolonged bar. The elongated bar has a substantially L-shape proximal end and a hook shape distal end, wherein the height of the elongated bar is more than the predetermined height of the skirt such as when the prolonged bar is coupled to the lid, the elongated bar extends downwards along by the predetermined height of the skirt and the hook shape distal end is positioned just below the periphery of the skirt.

In one aspect, disclosed is a method of waste management, the method includes the steps of providing the disclosed refuse container. The method further includes the steps of inserting a hand between the skirt and the elongated bar, such as to grasp the elongated bar. Once grasped, the elongated bar can be turned outwards and thereafter forced upwards to lift the lid gaining access to an interior of the container. The method further includes a step of tilting the refuse container forward which results in the elongated bar hanging away from the container under gravity. The refuse container can be continued to be tilted resulting in the opening of the lid.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
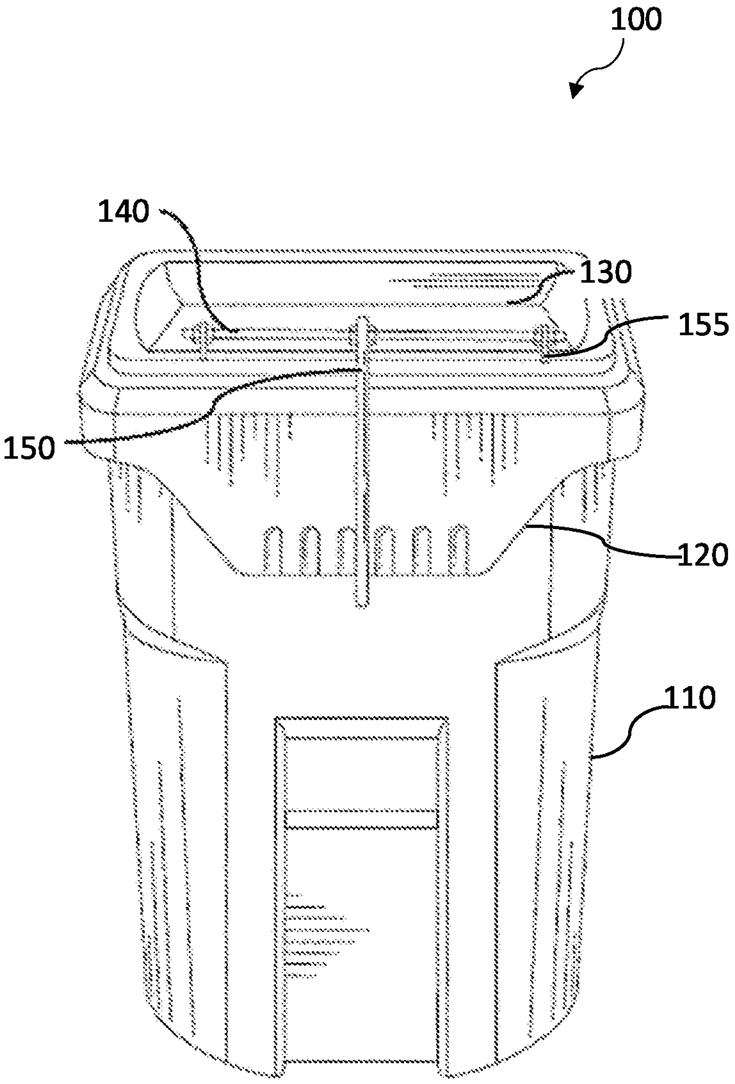
FIG. 1 is a front view of a refuse container showing a horizontal prolonged bar and a traversing elongated bar, according to an exemplary embodiment of the present invention.
Figure 2:
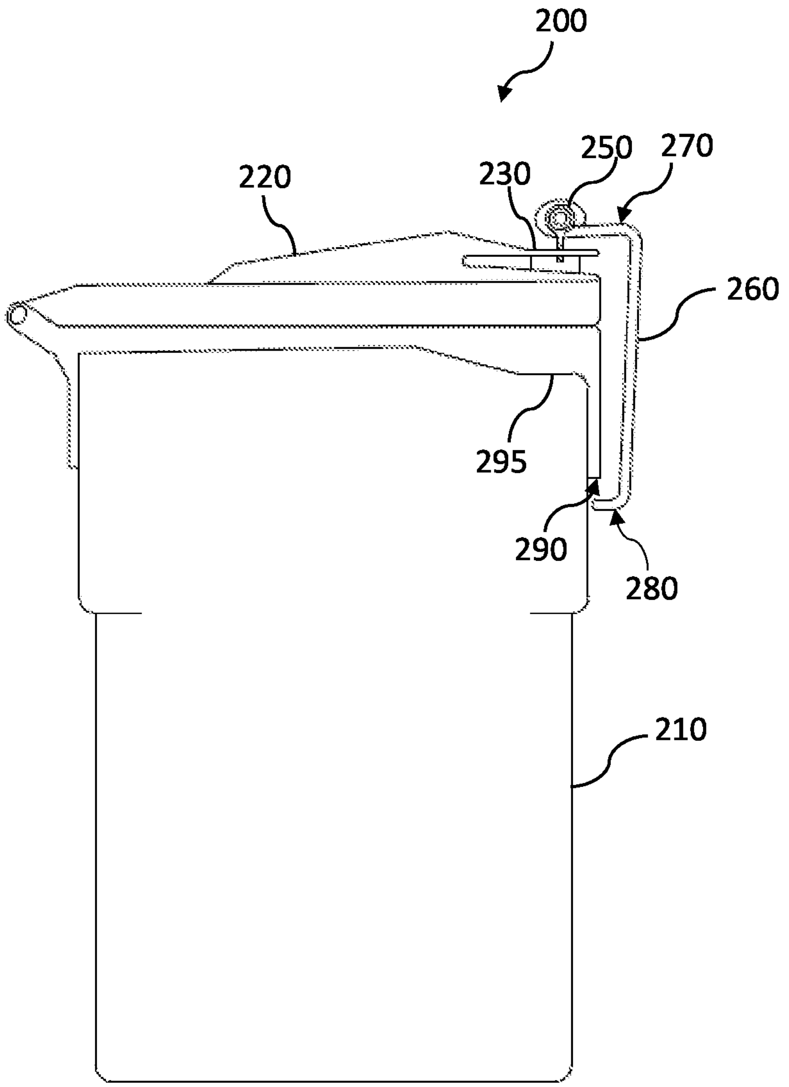
FIG. 2 is a side view of a refuse container showing a substantially L-shape proximal end and a hook shape distal end of an elongated bar, according to an exemplary embodiment of the present invention.

Disclosed is a refuse container that can be provided at public places and outside the residents for garbage collection. The refuse container can be in large capacities, such as about 900 gallons. Referring to FIG. 1, the disclosed refuse container 100 includes a large capacity container 110. Preferably, the container has four sidewalls and a base defining an inner volume of the container. An open-top of the container provides access to the inner volume of the container. Along a periphery of the open-top can be provided a skirt 120 of a predetermined height and thickness. The skirt 120 extends around the top portion of the container 110. The open-top of the container and the skirt can form a rim of the container 100. A lid 130 can be pivotally coupled to the skirt 120 of the container. The lid covers the open-top of the container and can rest against the rim of the container. The lid 130 can be lifted to gain access into the inner volume of the container 100. A horizontal planar extension can be provided in the lid, as shown in FIG. 2, as a handle that can be grasped to lift the lid. Optionally, a pair of wheels can be provided on the side bottom of the container that may allow moving the container in a tilted position wherein the weight of the container lies on the pair of wheels.

Also disclosed is a hook assembly for securing the lid to the container. FIG. 1 shows the front face of the assembly that has a prolonged bar 140 that can be coupled to the lid through a pair of fasteners 155 at opposite ends. The pair of fasteners can be eye bolts at the ends of the prolonged bar. Any other fastener can be used to couple the prolonged bar to the lid and any such fastener is within the scope of the present invention. The prolonged bar can be durable and made from metal, such as stainless steel. The length of the prolonged bar can be at least half the length of the side of the lid that is parallel to the prolonged bar. In one case, the prolonged bar can be about one-third of the length of the side of the lid. The assembly also includes an elongated bar 150. The elongated bar can have a proximal end and a distal end. The proximal end of the elongated bar can be substantially L-shape and the distal end can be hook shape. The substantially L-shape proximal end can be swively coupled to the prolonged bar 140. FIG. 1 shows the proximal end of the elongated bar 150 coupled at mid of the prolonged bar 140 and the elongated bar 150 can hang downwards and rest against the skirt of the container. Or the hook shape distal end can be positioned below the skirt 120 of the container, such as upward movement of the lid, and thus the elongated bar is limited by the periphery of the skirt. The upward movement of the lid is limited to a distance between the hook shape proximal end and the periphery of the skirt.

Referring to FIG. 2, which shows another exemplary embodiment of the refuse container 200. The refuse container 200 has a container 210 and a lid 220. The lid 220 can include the horizontal extension 230 to which a prolonged bar is shown coupled. This horizontal extension 230 is generally provided in the lid as a handle to lift the lid. The prolonged bar (not visible) is above a top surface of the horizontal extension 230 and fastened using eye bolts 250. It is to be understood that the horizontal extension 230 can be slightly sloped and any such variations of the horizontal extension 230 are within the scope of the present invention. In one case, the prolonged bar can be about 15-20 inches in length. More preferably, the prolonged bar can be about 17 inches in length for a standard-size refuse container with a capacity of about 990 gallons. An elongated bar 260 can also be seen having a substantially L-shape proximal end 270 and a hook shape distal end 280. The substantially L-shape proximal end 270 of the elongated bar 260 is swively coupled to the prolonged bar. It is understood that there can be variations in the angle of the substantially L-shape proximal end 270 of the elongated bar 260 depending upon variations in the shape of the lid and the container. For example, the proximal end of the elongated bar can resemble a "7" shape wherein an angle between two legs can be less than 90 degrees. Thus, the substantially L-shape can include the shape or angles ranging from "7" shape i.e., 60° to perfect "L" shape i.e., 90°. The elongated bar can also be made from a durable material such as metal. Stainless steel is known for strength and corrosion resistance and can preferably be used for the manufacture of the elongated bar. While the elongated bar extends downwards from the prolonged bar and along by the height of the skirt, the elongated bar can rest against the lower edge of the skirt and the distal hook end can hang below the periphery 290 of the skirt 295, as shown in FIG. 2. Alternatively, the distal end of the hook can rest against a wall of container 210. The thickness of the skirt 295 can be such as the hook shape distal end 280 of the elongated bar 260 can latch to the periphery 290 of the skirt 295 when the lid and thus the elongated bar 260 is lifted. Thus, lifting of the lid also forces the elongated bar to move vertically upwards while the periphery of the skirt limits the upwards movement by retaining the hook shape distal end of the elongated bar.

To open the lid, the elongated bar can be grasped and pulled outwards, such as the hook shape distal end is no more below the periphery of the skirt. Thereafter, upwards force can be applied to the elongated bar resulting in the lifting of the lid. The user can hold the elongated bar and does not have to touch any other surface of the container or the lid. Moreover, the surface of the elongated bar can be smooth to prevent the accumulation of dust and germs. Also, the elongated bar can be easily sanitized using a disinfectant. In one case, an antiviral layer of an antiviral compound can be provided on the surface of the elongated bar that kills any deposited microbes on the surface. In one case, the length of the elongated bar can be about 12 to 14 inches, and more preferably, about 13 inches for a standard-size refuse container.

Figure 3:
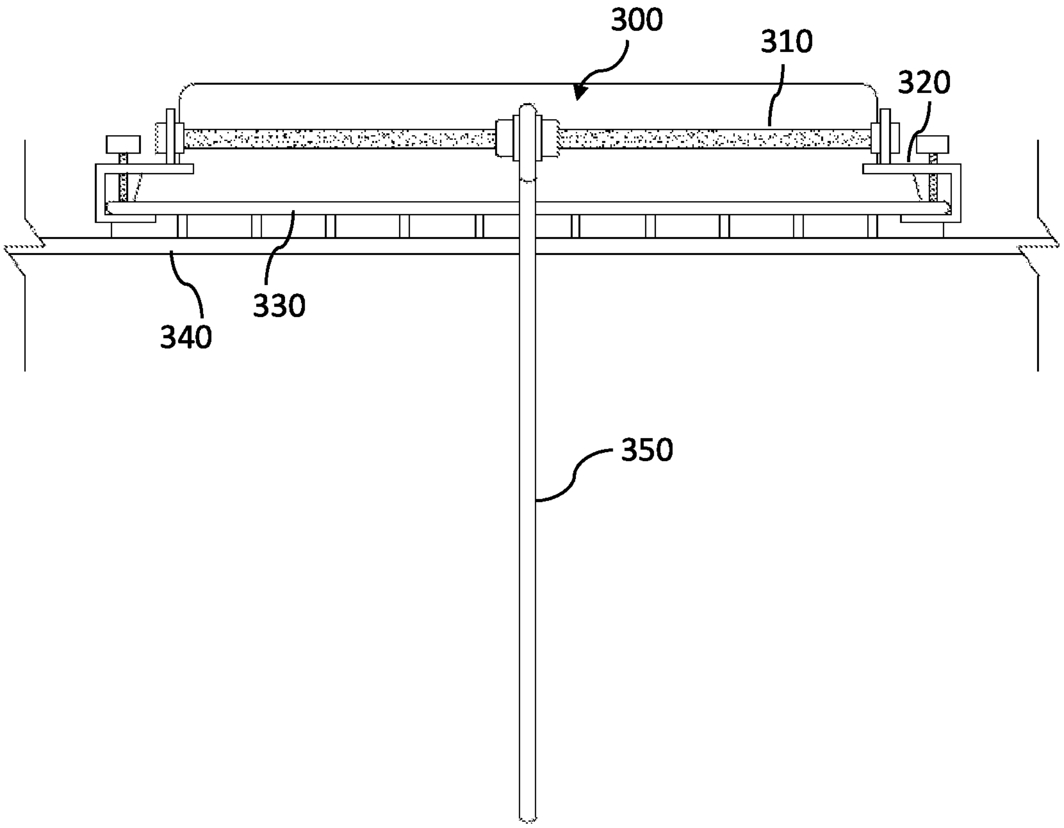
FIG. 3 shows a hook assembly of the refuse container having clamps to secure a prolonged member to a lid of the refuse container, according to an exemplary embodiment of the present invention.

FIG. 3 shows an alternative embodiment of the hook assembly 300 in which the prolonged bar 310 can be coupled to the lid using a pair of clamps 320. In case, the lid does not have any apertures and no modifications to the lid are desired, the clamps can be used to couple the prolonged bar 310 to the lid. The clamps 320 are shown in FIG. 3 having jaws that clamp to the horizontal extension 330 of the lid 340. The horizontal extension was previously described for FIG. 2 as handles of the lid and are generally provided in the lids of the refuse containers. Clamps 320 can be secured to such horizontal extension or similar structure in the lid. The clamps can generally grip a plate-like structure in the lid and allow mounting the prolonged bar to the lid without making any apertures in the lid. Thus, clamps may be desired when there are no apertures in the lid for the eye bolts and it is not desired to make the apertures. In one case, the clamps can also be secured to opposite sides of the lid. The elongated bar 350 can be seen swively coupled to the prolonged bar. The structure and functioning of the prolonged bar and the elongated bar have been described previously for FIG. 2 and is not repeated here. Additionally, the prolonged bar can be swively mounted to the pair of clamps. In case, the elongated bar has limited free rotation due to any reason, the prolonged bar can swivel and allow the opening of the lid.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A refuse container comprising:

a container, the container having an open-top, and a skirt extending around a periphery of the open-top;

a lid pivotally coupled to the skirt, the lid comprising a bottom side in communication with the open-top and a top side in communication with the atmosphere positioned above the skirt, wherein a horizontal planar extension having a first end and a second end is coupled to the top side in communication with the atmosphere;

a prolonged bar coupled to the horizontal planar extension; and an elongated bar having a substantially L-shape proximal end swively coupled to the prolonged bar at a connection point forming a rotation axis above the top side in communication with the atmosphere and a hook shape distal end, wherein the connection point is coaxial with the prolonged bar, and wherein the substantially L-shaped proximal end of the elongated bar extends downwards along the skirt of the container and the hook shape distal end of the elongated bar is positioned under a periphery of the skirt, and wherein the skirt limits a vertical movement of the hook shape distal end.

2. The refuse container according to claim 1, wherein lifting of the lid is limited to a distance between the periphery of the skirt and the hook shape distal end when the hook shape distal end of the elongated bar is positioned under the periphery of the skirt.

3. The refuse container according to claim 1, wherein a distance between a front of the skirt and the elongated bar is at least to permit a hand to be inserted between the skirt and the elongated bar for grasping the elongated bar.

4. The refuse container according to claim 1, wherein a length of the prolonged bar is at least half a length of a side of the lid parallel to the prolonged bar.

5. The refuse container according to claim 4, wherein the length of the prolonged bar is one-third of the length of the side of the lid.

6. The refuse container according to claim 1, wherein a first end of the prolonged bar is coupled to the first end of the horizontal planar extension via a first clamp and a second end of the prolonged bar is coupled the second end of the horizontal planar extension via a second clamp.

7. The refuse container according to claim 6, wherein no modification is made to the lid for gripping the pair of clamps.

8. The refuse container according to claim 7, wherein the prolonged bar is swively mounted to the pair of clamps.

9. The refuse container according to claim 4, wherein the length of the prolonged bar is about 15-20 inches and a length of the elongated bar is about 12 to 14 inches, wherein the connection point of the substantially L-shape proximal end of the elongated bar is at a middle portion of the prolonged bar.

10. A hook assembly for securing an opening of a lid in a refuse container, the refuse container has an open-top and a skirt around a periphery of the open-top, the skirt is of a predetermined height and thickness, the lid comprising a bottom side in communication with the open-top and a top side in communication with the atmosphere positioned above the skirt, and wherein the lid is pivotally coupled to the skirt, the hook assembly comprising:

a prolonged bar having a first end and a second end;

a pair of fasteners for coupling the prolonged bar to a horizontal planar attachment coupled to the top side of the lid in communication with the atmosphere positioned above the skirt; and an elongated bar swively coupled to the prolonged bar, the elongated bar having a substantially L-shape proximal end and a hook shape distal end, wherein the substantially L-shape proximal end is coupled to the prolonged bar at a connection point forming a rotation axis above the top side of the lid in communication with the atmosphere, wherein the connection point is coaxial with prolonged bar, wherein a height of the elongated bar is more than the predetermined height of the skirt such as when the prolonged bar is coupled to the horizontal planar attachment coupled to the top side of the lid, the elongated bar extends downwards along by the predetermined height of the skirt and the hook shape distal end is positioned under a periphery of the skirt, and wherein the periphery of the skirt limits a vertical upward movement of the hook shape distal end and the vertical upward movement of the lid is limited to a distance between the periphery of the skirt and the hook shape distal end.

11. The hook assembly according to claim 10, wherein the pair of fasteners are clamps, the clamps configured to fasten to the horizontal planar attachment coupled to the top side of lid without any modification to the horizontal planar attachment and lid.

12. The hook assembly according to claim 11, wherein the prolonged bar is swively coupled to the pair of clamps.

13. A method of waste management, the method comprising the steps of: providing a refuse container, comprising:

a container having an open top and a skirt extending around a periphery of the open top;

a lid pivotally coupled to the skirt, the lid comprising a bottom side in communication with the open-top and a top side in communication with the atmosphere positioned above the skirt, wherein a horizontal planar extension having a first end and a second end is coupled to the top side in communication with the atmosphere;

a prolonged bar coupled to the horizontal planar extension; and an elongated bar having a substantially L-shaped proximal end and a hook shaped distal end, wherein the substantially L-shaped proximal end is swively coupled to the prolonged bar at a connection point forming a rotation axis above the top side in communication with the atmosphere, wherein the connection point is coaxial with the prolonged bar, and wherein the L-shaped proximal end extends downwards along the skirt of the container and the hook shaped distal end is positioned under a periphery of the skirt, and wherein the skirt limits a vertical movement of the hook shape distal end.

14. The method according to claim 13, wherein the method further comprises the steps of:

inserting a hand between the elongated bar and the skirt for grasping the elongated bar;

pulling outward the elongated bar; and upon pulling the elongated bar, applying an upwards force to lift the lid.

15. The method according to claim 13, wherein the method further comprises the steps of:

tilting the refuse container forward resulting in outward turning of the elongated bar; and further tilting the refuse container resulting in opening of the lid.

* * * * *